US012488932B2

(12) United States Patent
Jung et al.

(10) Patent No.: US 12,488,932 B2
(45) Date of Patent: Dec. 2, 2025

(54) COIL COMPONENT

(71) Applicant: SAMSUNG ELECTRO-MECHANICS CO., LTD., Suwon-si (KR)

(72) Inventors: Hyun Ju Jung, Suwon-si (KR); Tae Ryung Hu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1002 days.

(21) Appl. No.: 17/529,677

(22) Filed: Nov. 18, 2021

(65) Prior Publication Data

US 2022/0199315 A1 Jun. 23, 2022

(30) Foreign Application Priority Data

Dec. 22, 2020 (KR) ........................ 10-2020-0180614

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/32* (2013.01);
(Continued)

(58) Field of Classification Search
CPC .. H01F 27/2804; H01F 27/2885; H01F 27/29; H01F 27/32; H01F 41/041; H01F 41/12; H01F 2027/2809
See application file for complete search history.

(56) References Cited

U.S. PATENT DOCUMENTS 11,017,931 B2 * 5/2021 Kang ........................ H01F 5/00
11,640,870 B2 * 5/2023 Yang ....................... H01F 27/29
(Continued)

FOREIGN PATENT DOCUMENTS

JP H0684687 * 3/1994 ........... H05K 3/3431
JP 2014036149 * 8/2012 ............. H01G 4/248
(Continued)

OTHER PUBLICATIONS

Office Action issued in corresponding Korean Patent Application No. 10-2020-0180614 on Apr. 30, 2025, with English translation.

*Primary Examiner* — Malcolm Barnes
(74) *Attorney, Agent, or Firm* — MORGAN, LEWIS & BOCKIUS LLP

(57) ABSTRACT

A coil component includes: a body; a coil portion disposed in the body and including a lead-out pattern exposed on one end surface of the body; an insulating layer disposed on the one end surface of the body and having an opening disposed on the lead-out pattern; an external electrode including a connection portion, disposed to be in contact with the lead-out pattern, and a pad portion extending from the connection portion to one surface of the body; and a cover insulating layer disposed on the one end surface of the body to cover the connection portion. The connection portion is spaced apart from all corner portions of the one end surface of the body, except for a corner portion between the one end surface of the body and one surface of the body, on the one end surface of the body.

14 Claims, 16 Drawing Sheets

(51) Int. Cl.
*H01F 27/32* (2006.01)
*H01F 41/04* (2006.01)
*H01F 41/12* (2006.01)

(52) U.S. Cl.
CPC .......... *H01F 41/041* (2013.01); *H01F 41/12* (2013.01); *H01F 2027/2809* (2013.01)

(56) References Cited

U.S. PATENT DOCUMENTS

| | | | | |
|---|---|---|---|---|
| 2016/0086714 | A1* | 3/2016 | Moon | H01F 27/292 336/200 |
| 2018/0182537 | A1* | 6/2018 | Shimizu | H01F 27/29 |
| 2019/0311829 | A1 | 10/2019 | Kang et al. | |
| 2020/0090853 | A1 | 3/2020 | Yang et al. | |
| 2020/0335253 | A1* | 10/2020 | Yeo | H01F 41/122 |

FOREIGN PATENT DOCUMENTS

| | | | |
|---|---|---|---|
| JP | 2018-107346 | A | 7/2018 |
| KR | 10-1580411 | B1 | 12/2015 |
| KR | 10-2016499 | B1 | 9/2019 |
| KR | 10-2020-0031426 | A | 3/2020 |

* cited by examiner

COIL COMPONENT

CROSS-REFERENCE TO RELATED APPLICATION(S)

The present application claims the benefit of priority to Korean Patent Application No. 10-2020-0180614, filed on Dec. 22, 2020 in the Korean Intellectual Property Office, the entire disclosure of which is incorporated herein by reference.

TECHNICAL FIELD

The present disclosure relates to a coil component.

BACKGROUND

An inductor, a coil component, is a representative passive electronic component used in electronic devices together with a resistor and a capacitor.

As electronic devices are designed to have higher performance and to be decreased in size, electronic components used in electronic devices have increased in number and decreased in size.

When a coil component is formed using a plating process to be decreased in size, plating bleeding may cause an external device to extend to a position outside of a target formation position.

SUMMARY

An aspect of the present disclosure is to provide a coil component which may prevent plating bleeding of an external electrode while maintaining connectivity between a coil portion and the external electrode.

Another aspect of the present disclosure is to reduce a process lead time by omitting a process of removing burring after a dicing process.

According to an aspect of the present disclosure, a coil component includes: a body; a support substrate disposed in the body; a coil portion disposed on the support substrate and including a first lead-out pattern extending from one end surface of the body; a first insulating layer disposed on the one end surface of the body, and having an opening disposed on a surface of the first lead-out pattern extending from the one end surface of the body and on at least a portion of the one end surface of the body; a first external electrode including a first connection portion, disposed to be in contact with the first lead-out pattern, and a first pad portion extending from the first connection portion to one surface of the body connected to the one end surface of the body; and a cover insulating layer disposed on the one end surface of the body to cover the first connection portion. The first connection portion is spaced apart from all corner portions of the one end surface of the body, except for a corner portion between the one end surface of the body and one surface of the body, on the one end surface of the body.

According to an aspect of the present disclosure, a coil component includes: a body; a support substrate disposed in the body; a coil portion disposed on the support substrate and including a lead-out pattern extending from one end surface of the body; a first insulating layer disposed on one end surface of the body, and having an opening disposed on the lead-out pattern; an external electrode including a connection portion, disposed in the opening of the first insulating layer to be in contact with the lead-out pattern, and a pad portion extending from the connection portion to one surface of the body connected to the one end surface of the body; and a cover insulating layer disposed on the one end surface of the body to cover the connection portion. The connection portion is spaced apart from edges of the one end surface of the body, except for an edge between the one end surface of the body and the one surface of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
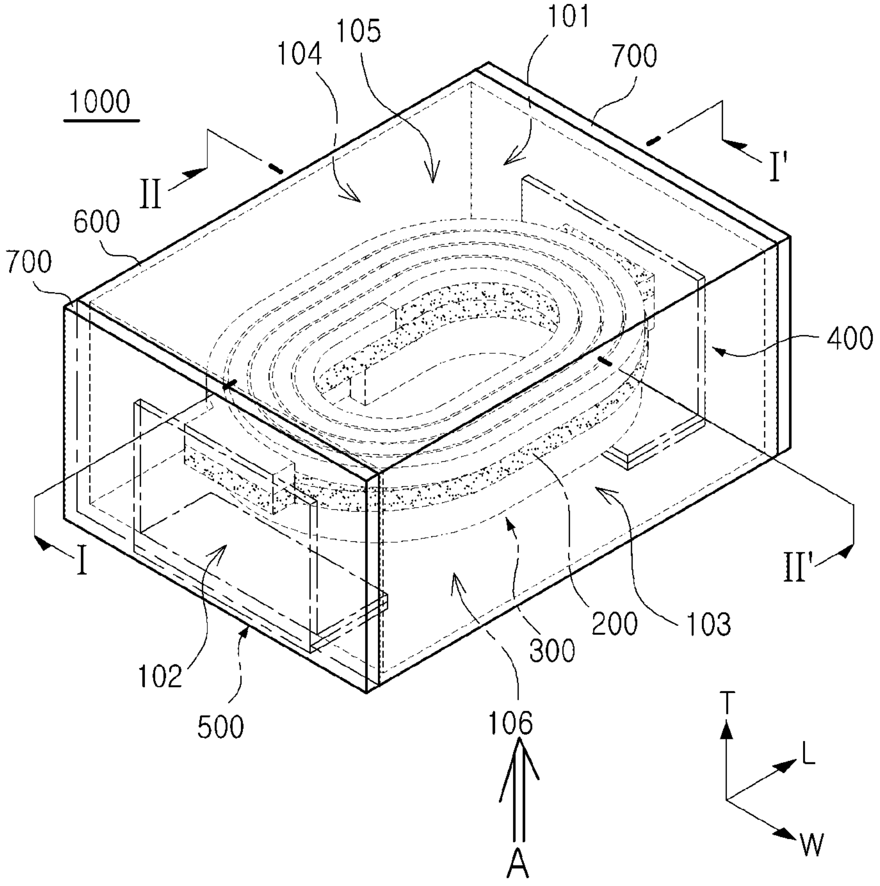
FIG. 1 is a perspective view of a coil component according to an exemplary embodiment of the present disclosure.

The terms used in the example embodiments are used to simply describe an example embodiment, and are not intended to limit the present disclosure. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term “disposed on,” “positioned on,” and the like, may indicate that an element is positioned on or beneath an object, and does not necessarily mean that the element is positioned on the object with reference to a gravity direction.

The term “coupled to,” “combined to,” and the like, may not only indicate that elements are directly and physically in contact with each other, but also include the configuration in which the other element is interposed between the elements such that the elements are also in contact with the other component.

Sizes and thicknesses of elements illustrated in the lead-outs are indicated as examples for ease of description, and example embodiments in the present disclosure are not limited thereto.

In the lead-outs, an L direction is a first direction or a length direction, a W direction is a second direction or a width direction, a T direction is a third direction or a thickness direction.

In the descriptions described with reference to the accompanied lead-outs, the same elements or elements corresponding to each other will be described using the same reference numerals, and overlapped descriptions will not be repeated.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, or the like.

Figure 2:
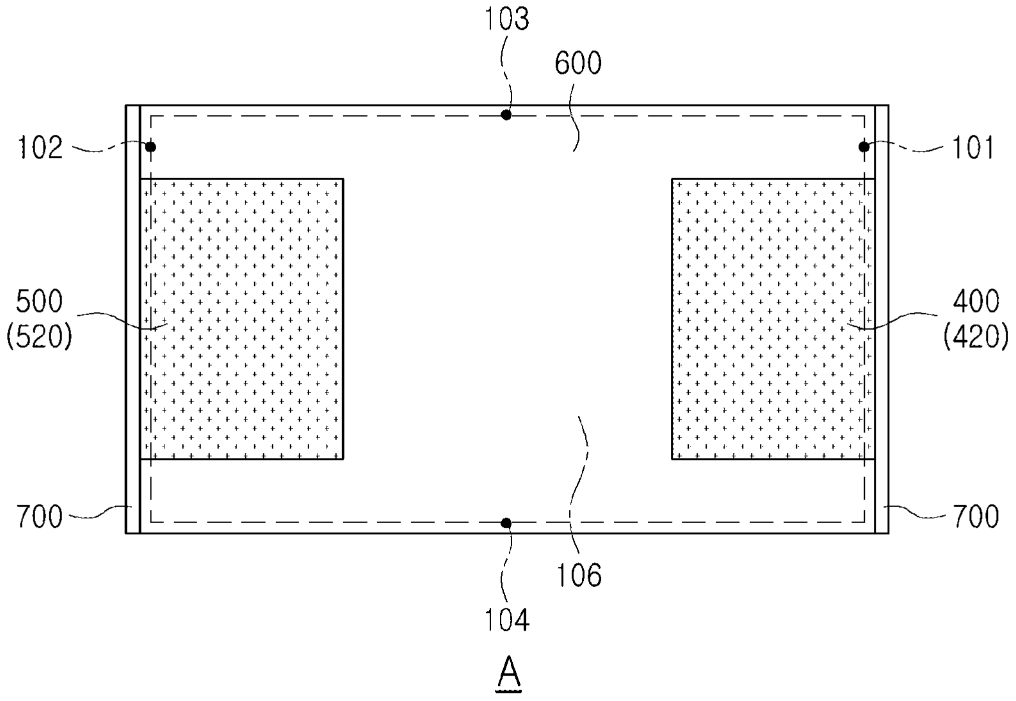
FIG. 2 is a schematic view taken in direction “A” of FIG. 1.
Figure 3:
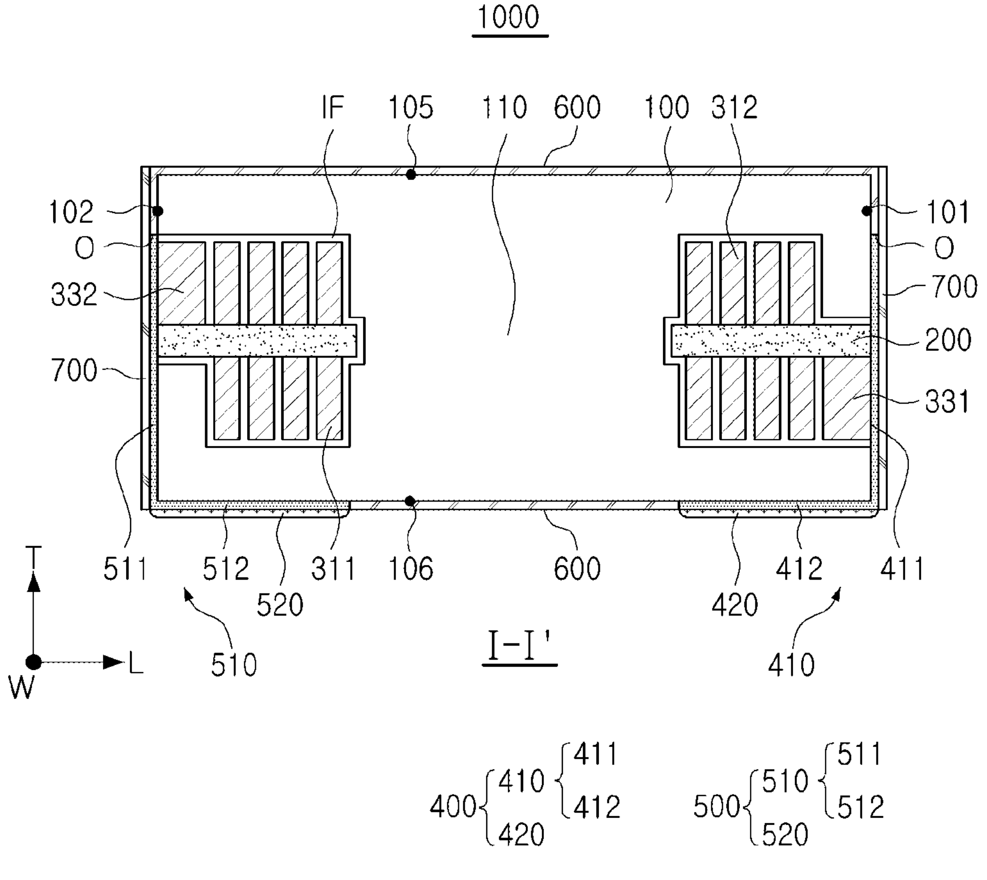
FIG. 3 is a cross-sectional view taken along line I-I' of FIG. 1.
Figure 4:
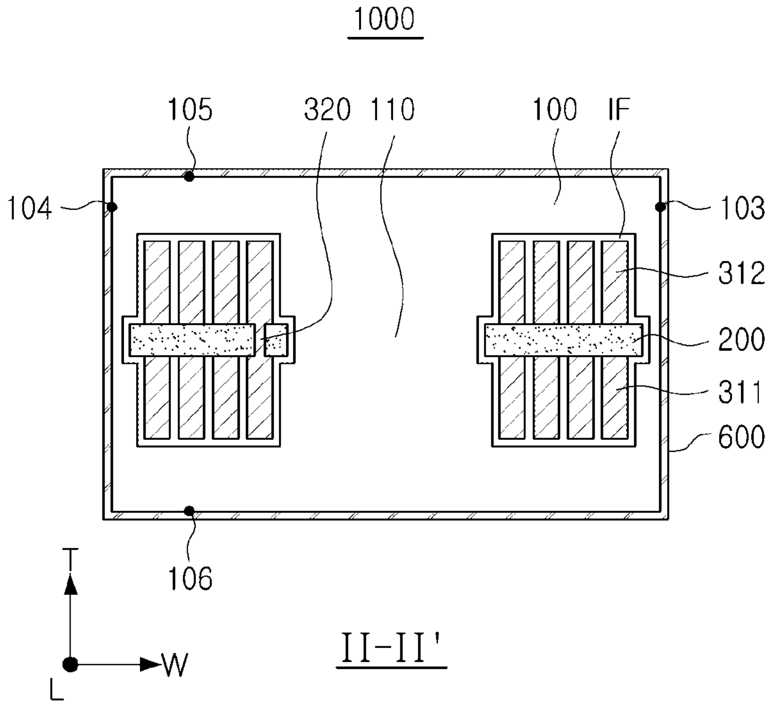
FIG. 4 is a cross-sectional view taken along line II-II' of FIG. 1.
Figure 5:
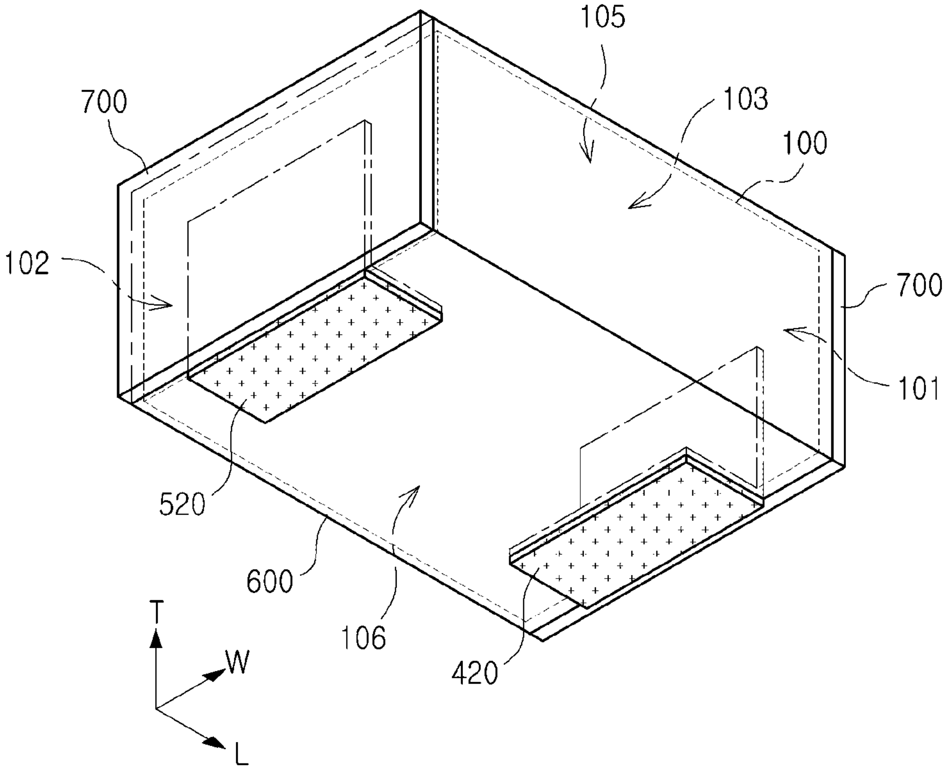
FIG. 5 is a schematic perspective view of a coil component, when viewed from below.
Figure 6:
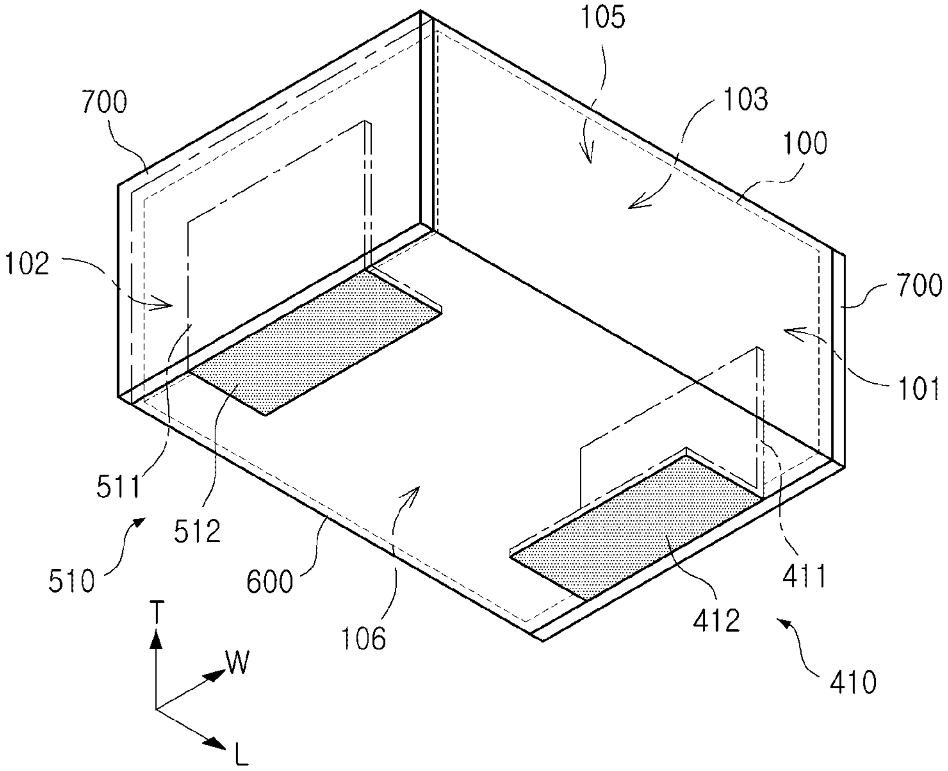
FIG. 6 is a schematic perspective view in which a second layer of an external electrode is omitted from FIG. 5.
Figure 7:
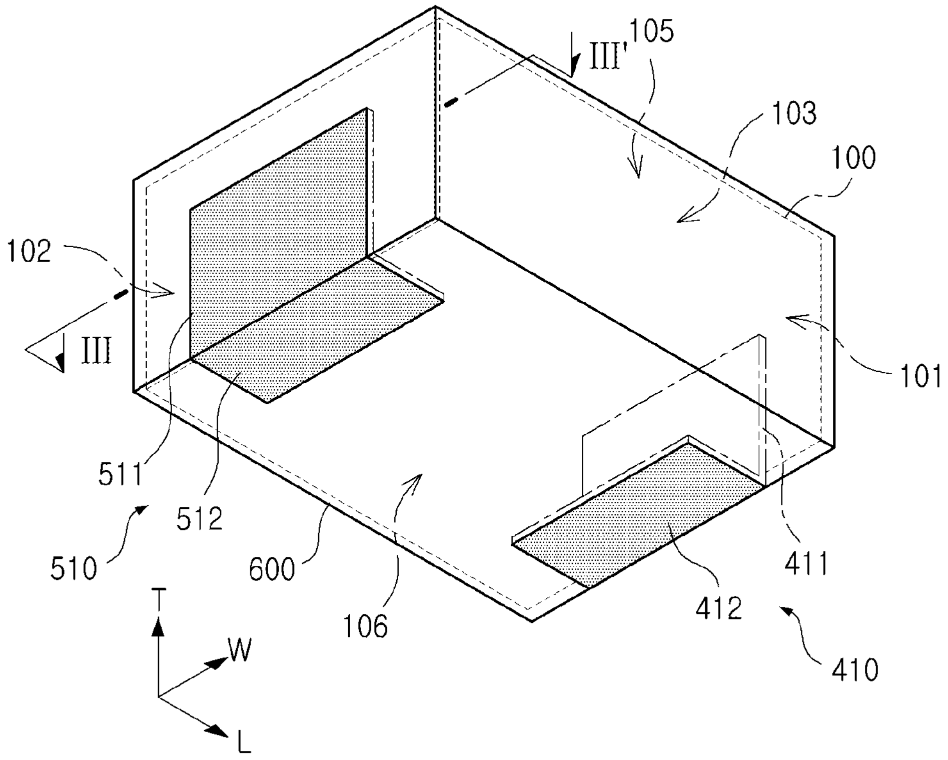
FIG. 7 is a schematic perspective view in which a cover insulating layer is omitted from FIG. 6.
Figure 8:
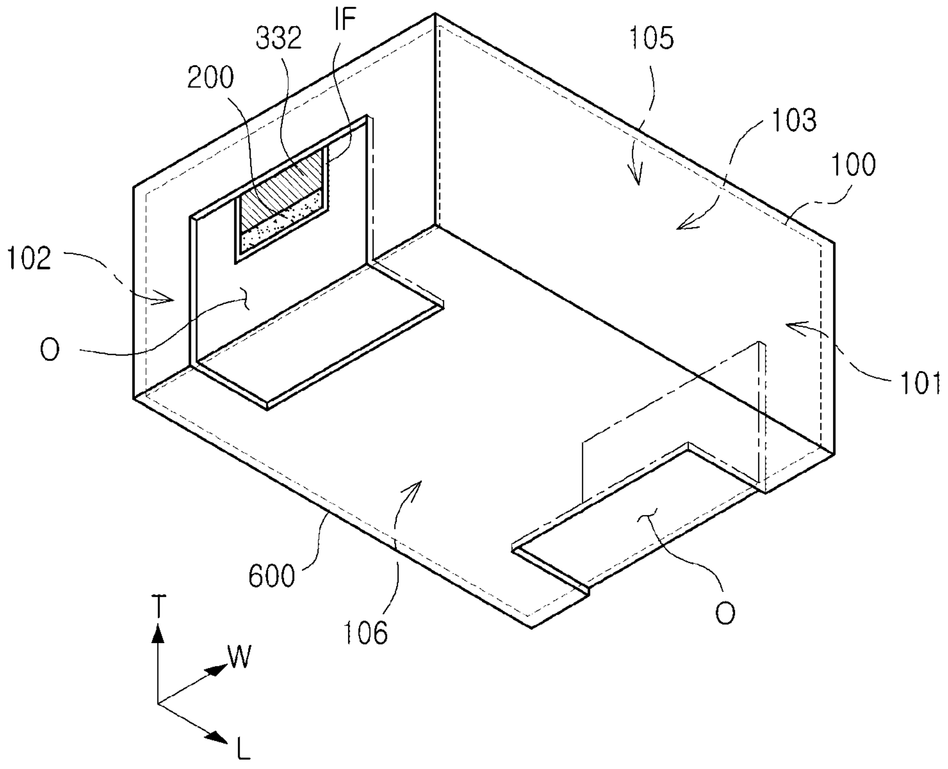
FIG. 8 is a schematic perspective view in which a first layer of an external electrode is omitted from FIG. 7.
Figure 9:
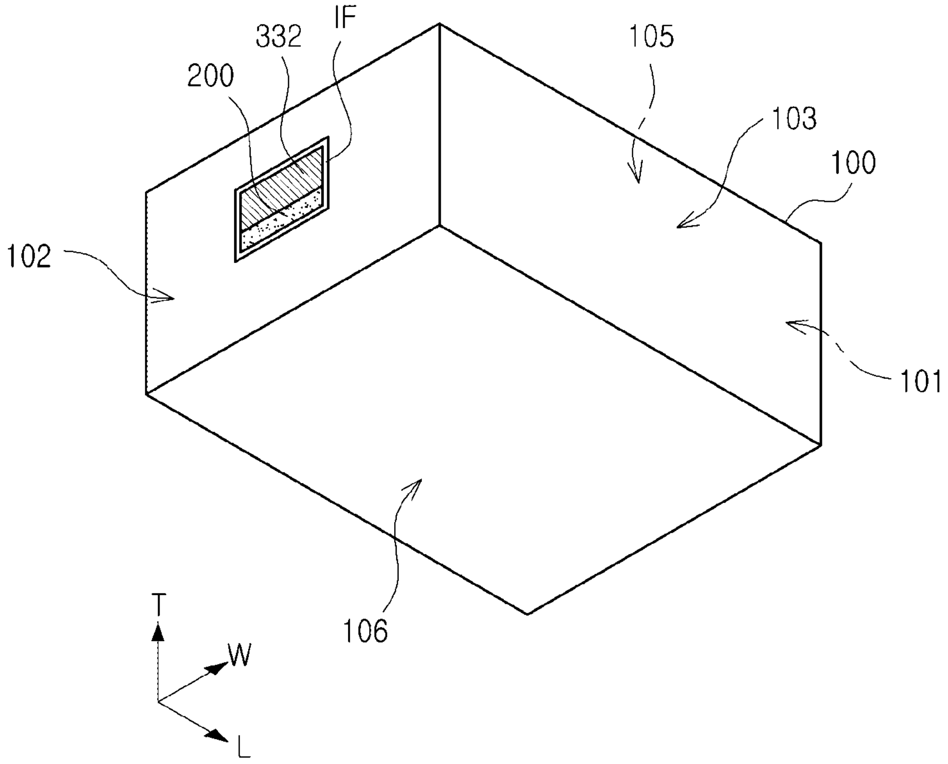
FIG. 9 is a schematic perspective view in which a surface insulating layer is omitted from FIG. 8.
Figure 10:
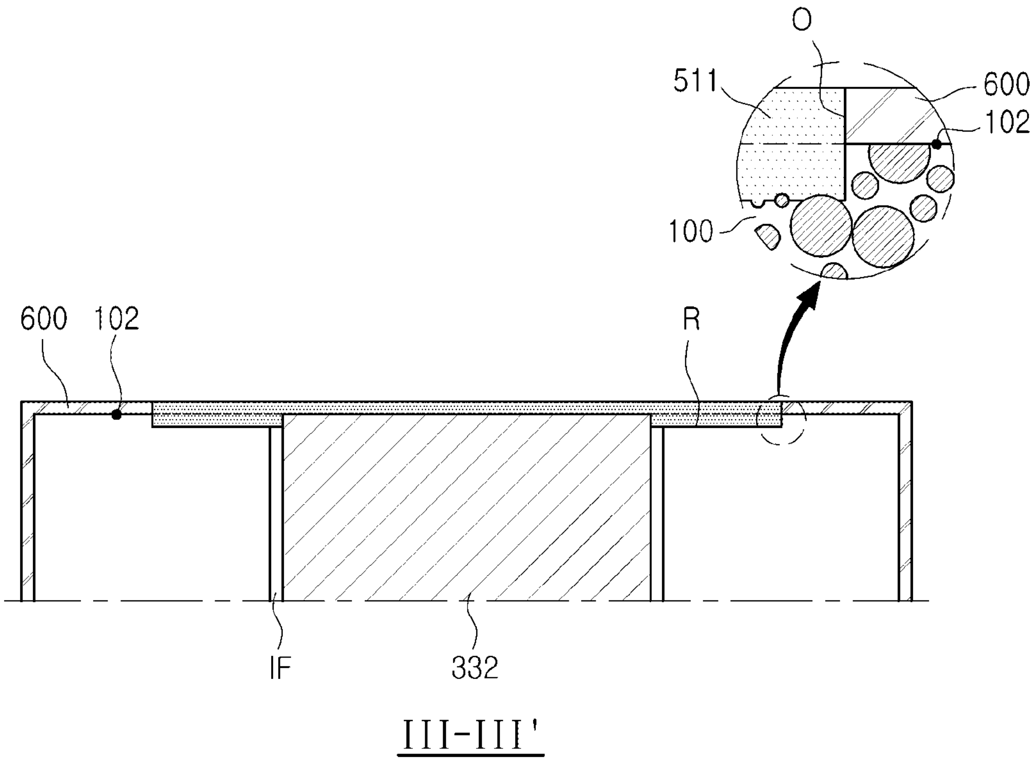
FIG. 10 is a cross-sectional view taken along line III-III' of FIG. 7.

FIG. 1 is a perspective view of a coil component according to an exemplary embodiment. FIG. 2 is a schematic view taken in direction "A" of FIG. 1. FIG. 3 is a cross-sectional view taken along line I-I' of FIG. 1. FIG. 4 is a cross-sectional view taken along line II-II' of FIG. 1. FIG. 5 is a schematic perspective view of a coil component, when viewed from below. FIG. 6 is a schematic perspective view in which a second layer of an external electrode is omitted from FIG. 5. FIG. 7 is s schematic perspective view in which a cover insulating layer is omitted from FIG. 6. FIG. 8 is a schematic perspective view in which a first layer of an external electrode is omitted from FIG. 7. FIG. 9 is a schematic perspective view in which a surface insulating layer is omitted from FIG. 8. FIG. 10 is a cross-sectional view taken along line III-III' of FIG. 7.

Referring to FIGS. 1 to 10, a coil component 1000 according to an exemplary embodiment may include a body 100, a support substrate 200, a coil portion 300, external electrodes 400 and 500, a surface insulating layer 600, a cover insulating layer 700, and an insulating film IF.

The body 100 may form an exterior of the coil component 1000 according to the present embodiment, and may include the coil portion 300 embedded therein.

The body 100 may be formed to have an overall hexahedral shape.

Hereinafter, an exemplary embodiment will be described on the assumption that the body 100 has a hexahedral shape. However, such description does not exclude a coil component, including a body formed to have a shape other than the hexahedral shape, from the scope of the present embodiment.

The body 100 may have a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100 to each other. Hereinafter, both end surfaces (one end surface and the other end surface) of the body 100 may refer to the first surface 101 and the second surface 102 of the body 100, respectively, and both side surfaces (one side surface and the other side surface) of the body 100 may refer to the third surface 103 and the fourth surface 104 of the body 100, respectively. In addition, one surface and the other surface of the body 100 may refer to the sixth surface 106 and the fifth surface 105 of the body 100, respectively. When the coil component 1000 according to an exemplary embodiment is mounted on a mounting board such as a printed circuit board (PCB), or the like, the one surface 106 of the body 100 is disposed to face a mounting surface of the mounting board to be mounted on the mounting board.

The body 100 may be formed such that the coil component 1000, including the external electrodes 400 and 500 to be described later, has a length of 2.0 mm, a width of 1.2 mm, and a thickness of 0.65 mm, but an example of the sizes is not limited thereto. Values of the length, width, and thickness of the coil component 100 exclude a tolerance, and actual length, width and thickness of the coil component 1000 may be different from the above values due to the tolerance.

The length of the coil component 1000 described above may refer to a maximum value of dimensions of a plurality of lines connecting two outermost boundaries of the coil component 1000, opposing each other in the length direction L, and parallel to the length direction L, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the length of the coil component 1000 described above may refer to an arithmetic mean value of at least two or more of dimensions of a plurality of lines connecting two outermost boundaries of the coil component 1000 opposing each other in the length direction L and parallel to the length direction L, the coil component 1000 illustrated in the image of the cross-sectional surface.

The thickness of the coil component 1000 described above may refer to a maximum value of dimensions of a plurality of lines connecting two outermost boundaries of the coil component 1000, opposing each other in the thickness direction T, and parallel to the thickness direction T, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the thickness of the coil component 1000 described above may refer to an arithmetic mean value of at least two or more of dimensions of a plurality of lines connecting two outermost boundaries of the coil component 1000, opposing each other in the thickness direction T, and parallel to the thickness direction T, the coil component 1000 illustrated in the image of the cross-sectional surface.

The width of the coil component 1000 described above may refer to a maximum value of a plurality of lines connecting two outermost boundaries of the coil component 1000, opposing each other in the width direction W, and parallel to the width direction W, the coil component 1000 illustrated in the image of a cross-sectional surface of a central portion of the coil component 1000 in the length direction L, taken in the width direction W and the thickness direction T, obtained by an optical microscope or a scanning electron microscope (SEM). Alternatively, the width of the coil component 1000 described above may refer to an arithmetic mean value of dimensions of at least two or more of a plurality of lines connecting two outermost boundaries of the coil component 1000, opposing each other in the width direction W, and parallel to the width direction W, the coil component 1000 illustrated in the image of the cross-sectional surface.

Alternatively, each of the length, the width, and the thickness of the coil component 1000 may be measured by a micrometer measurement method. In the micrometer measurement method, a zero point may be set by a gauge repeatability and reproducibility (R&R) micrometer, the coil component 1000 of the example embodiment may be inserted between tips of the micrometer, and the measuring may be performed by rotating a measurement lever of the micrometer. In measuring the length of the coil component 1000 by the micrometer measurement method, the length of the coil component 1000 may refer to a value of the length measured once or an arithmetic mean of values of the length measured multiple times. Such a configuration may also be applied to the width and the thickness of the coil component 1000.

The body 100 may include a magnetic material and a resin. Specifically, the body 100 may be formed by laminating one or more composite magnetic sheets including a magnetic material dispersed in the resin. However, the body 100 may have a structure, other than the structure including the magnetic material dispersed in the resin. For example, the body 100 may be formed of a magnetic material such as a ferrite, or may be formed of a non-magnetic material.

The magnetic material may be ferrite powder particles or magnetic metal powder particles.

As an example, the ferrite powder particles may include at least one selected from spinel type ferrite such as Mg—Zn based ferrite, Mn—Zn based ferrite, Mn—Mg based ferrite, Cu—Zn based ferrite, Mg—Mn—Sr based ferrite, and Ni—Zn based ferrite, hexagonal ferrite such as Ba—Zn based ferrite, Ba—Mg based ferrite, Ba—Ni based ferrite, Ba—Co based ferrite, and Ba—Ni—Co based ferrite, garnet type ferrite such as Y based ferrite, and Li based ferrite.

The metal magnetic powder particles may include at least one selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particles may include at least one of pure iron powder particles, Fe—Si based alloy powder particles, Fe—Si—Al based alloy powder particles, Fe—Ni based alloy powder particles, Fe—Ni—Mo based alloy powder particles, Fe—Ni—Mo—Cu based alloy powder particles, Fe—Co based alloy powder particles, Fe—Ni—Co based alloy powder particles, Fe—Cr based alloy powder particles, Fe—Cr—Si based alloy powder particles, Fe—Si—Cu—Nb based alloy powder particles, Fe—Ni—Cr based alloy powder particles, and Fe—Cr—Al based alloy powder particles.

The magnetic metal powder particles may be amorphous or crystalline. An example of the magnetic metal powder particles may be Fe—Si—B—Cr based amorphous alloy powder particles, but the present disclosure is not limited thereto.

The ferrite powder particles and the magnetic metal powder particles may each have an average diameter of about 0.1 μm to 30 μm, but the average diameter is not limited thereto.

The body 100 may contain two or more types of magnetic materials dispersed in the resin. The phrase "different types of magnetic materials" means that the magnetic materials dispersed in the resin are distinguished from each other in one or more of an average diameter, a composition, crystallinity, and a shape thereof.

The resin may include one of an epoxy, a polyimide, a liquid crystal polymer, or mixtures thereof, but an example of the resin is not limited thereto.

The body 100 may include a core 110 penetration through a coil portion 300 to be described later. The core 110 may be formed by filling a through-hole of the coil portion 300 with a composite magnetic sheet, but exemplary embodiments are not limited thereto.

The support substrate 200 may be disposed in the body 100 and may support the coil portion 300 to be described later.

The support substrate 200 may be formed of an insulating material including at least one of thermosetting insulating resins such as an epoxy resin, thermoplastic insulating resins such as polyimide, and photosensitive insulating resins, or an insulating material in which a reinforcing material such as glass fiber or an inorganic filler is impregnated in such an insulating resin. As an example, the internal insulating layer IL may be formed of an insulating material such as copper clad laminate (CCL), prepreg, an Ajinomoto build-up film (ABF), FR-4, a Bismaleimide Triazine (BT) resin, a photo-imageable dielectric (PID), or the like, but an example of the insulating material is not limited thereto.

An inorganic filler may be one or more materials selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium. titanate ($BaTiO_3$), and calcium zirconate ($CaZrO_3$).

When the support substrate 200 is formed of an insulating material containing a reinforcing material, the support substrate 200 may provide more improved rigidity. When the support substrate 200 is formed of an insulating material which does not contain glass fiber, the support substrate 200 is advantageous for thinning the entire coil portion 300. When the support substrate 200 is formed of an insulating material containing a photosensitive insulating resin, the number of processes may be decreased to provide an advantage for reducing manufacturing costs and to form a fine hole.

The coil portion 300 may be disposed on the support substrate 200. The coil portion 300 may be embedded in the body 100 to exhibit characteristics of a coil component. For example, when the coil component 1000 according to the present embodiment is used as a power inductor, the coil portion 300 may store an electric field as a magnetic field to maintain an output voltage, and thus, may stabilize power of an electronic device.

The coil portion 300 may be formed on at least one of both surfaces of the support substrate 200, opposing each other, and may form at least one turn. The coil portion 300 may be disposed on one surface and the other surface of the support substrate 200, opposing each other in the thickness direction T of the body 100. In the present embodiment, the coil portion 300 may include a first coil pattern 311 and a first lead-out portion 331 disposed on one surface of the support substrate 200 opposing the sixth surface 106 of the body 100, a second coil pattern 312 and a second lead-out portion 332 disposed on the other surface of the support substrate 200, and a via 320 connecting innermost end portions of the first coil pattern 311 and the second coil pattern 312 to each other through the support substrate 200. As a result, the coil portion 300 applied to the present embodiment may be formed of a single coil generating a magnetic field in the thickness direction T of the body 100 based on the core 110.

Each of the first coil pattern 311 and the second coil patterns 312 may be in a planar spiral shape having at least one turn formed about the core 110. As an example, based on the directions of FIGS. 1, 3, and 4, the first coil pattern 311 may form at least one turn about the core 110 on a lower surface of the support substrate 200. The second coil pattern 312 forms at least one turn about the core 110 on an upper surface of the support substrate 200.

The lead-out portions 331 and 332 may be connected to the coil patterns 311 and 312 and may be exposed to the first and second surfaces 101 and 102 of the body 100, respectively. Specifically, the first lead-out portion 331 may be disposed on one surface of the support substrate 200 to be connected to the coil pattern 311 and to be exposed to (or to be in contact with or to extend from) the first surface 101 of the body 100. The second lead-out portion 332 may be disposed on the other surface of the support substrate 200 to be connected to the second coil pattern 312 and to be exposed to (or to be in contact with or to extend from) the second surface 102 of the body 100. The lead-out portions 331 and 332 may be exposed to the first and second surfaces 101 and 102 of the body 100 to be in contact with and connected to the external electrodes 400 and 500 to be described later, respectively.

At least one of the coil patterns 311 and 312, the via 320, and the lead-out patterns 331 and 332 may include at least one conductive layer. As an example, when the second coil pattern 312, the via 320, and the second lead-out pattern 332 are formed in a plating process, each of the second coil pattern 312, the via 320, and the second lead-out pattern 332 may include a seed layer, formed by vapor deposition such as electroless plating or sputtering, and an electroplating layer. The electroplating layer may have a single-layer structure or a multilayer structure. The electroplating layer having the multilayer structure may have a conformal structure in which one electroplating layer covers the other electroplating layer, or may have a form in which the other electroplating layer is laminated on only one surface of the one electroplating layer. The seed layers of the second coil pattern 312, the via 320, and the second lead-out pattern 332 may be integrated with each other, such that there may be no boundary therebetween, but are not limited thereto. The electroplating layers of the second coil pattern 312, the via 320, and the second lead-out pattern 332 may be integrated with each other, such that there may no boundary therebetween, but exemplary embodiments are not limited thereto.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), molybdenum (Mo), or alloys thereof, but the conductive material is not limited thereto.

The insulating film IF may be formed along the surfaces of the support substrate 200 and the coil portion 300. The insulating film IF may be provided to protect the coil portion 300 and insulate the coil portion 300 from the body 100 including conductive powder particles, and may include a known insulating material such as parylene. Any insulating material included in the insulating layer IF may be used, and is not limited. The insulating film IF may be formed by a method such as vapor deposition, but an example of the method is not limited thereto. The insulating film IF may be formed by laminating an insulating film on both surfaces of the support substrate 200. The insulating layer IF may be exposed to the first and second surfaces 101 and 102 of the body 100 together with the support substrate 200 and the drawing patterns 331 and 332.

The surface insulating layer 600 may be disposed on the first and second surfaces 101 and 102 of the body 100, respectively. An opening "O" may be formed in the surface insulating layer 600 to expose at least a portion of each of exposed surfaces of the first and second lead-out patterns 331 and 332, exposed to the first and second surfaces 101 and 102 of the body, and the first and second surfaces 101 and 102 of the body 100. Specifically, the surface insulating layer 600 may be disposed on the first surface 101 of the body 100. An opening "O" may be formed in the surface insulating layer 600, disposed on the first surface 101 of the body 100, to expose at least a portion of each of the exposed surface of the first lead-out pattern 331, exposed to the first surface 101 of the body 100, and the first surface 101 of the body 100. In addition, the surface insulating layer 600 may also be disposed on the second surface 102 of the body 100. An opening "O" may be formed in the surface insulating layer 600, disposed on the second surface 102 of the body 100, to expose at least a portion of each of the exposed surface of the second lead-out pattern 332, exposed to the second surface 102 of the body 100 and the body 100, and the second surfaces 102 of the body 100.

An internal wall of the opening "O," formed in the surface insulating layer 600, may not extend from the first and second surfaces 101 and 102 of the body 100 to a corner or an edge between each of the first and second surfaces 101 and 102 of the body 100 and each of the third, fourth, and fifth surfaces 103, 104, and 105 of the body 100. Specifically, an internal wall of the opening "O," formed in the surface insulating layer 600 disposed on the first surface 101 of the body 100, may have a form which does not extend to each of a corner portion or an edge between the first surface 101 and the third surface 103 of the body 100, a corner portion or an edge between the third surface 101 and the fourth surface 104 of the body 100, and a corner portion or an edge between the first surface 101 and the fifth surface 105 of the body 100. The opening "O," formed in the surface insulating layer 600 disposed on the first surface 101 of the body 100, may expose at least a portion of a corner portion or an edge between the first surface 101 and the sixth surface 106 of the body 100. That is, the surface insulating layer 600, disposed on the first surface of the body 100, may have a form covering the corner portion or the edge between the first surface 101 and the third surface 103 of the body 100, the corner portion or the edge between the first surface 101 and the fourth surface 104 of the body 100, and the corner portion or the edge between the first surface 101 and the fifth surface 105 of the body 100, and may have a form exposing at least a portion of the corner portion or the edge between the first surface 101 and the sixth surface of the body 100. An internal wall of the opening "O," formed in the surface insulating layer 600 of the body 100, may have a form which does not extend to a corner portion or an edge between the second surface 102 and the third surface 103 of the body 100, a corner portion or an edge between the second surface 102 and the fourth surface 104 of the body 100, and a corner portion or an edge between the second surface 102 and the fifth surface 105 of the body 100. The opening "O," formed in the surface insulating layer 600 disposed on the second surface 102 of the body 100, may expose at least a portion of a corner portion or an edge between the second surface 102 and the sixth surface 106 of the body 100. That is, the surface insulating layer 600, disposed on the second surface 102 of the body 100, may have a form covering the corner portion or the edge between the second surface 102 and the third surface 103 of the body 100, the corner portion or the edge between the second surface 102 and the fourth surface 104 of the body 100, and the corner portion or the edge between the second surface 102 and the fifth surface 105 of the body 100, and may have a form exposing at least a portion of the corner portion or the edge between the second surface 102 and the sixth surface 106 of the body 100. A first connection portion 411 and a second connection portion 511 of external electrodes 400 and 500 to be described later may be disposed in the opening "O" exposing each of the first and second surfaces 101 and 102 of the body 100. Due to the above-described structure of the opening "O" and the surface insulating layer 600, the first and second connection portions 411 and 511 may be prevented from extending to each of the third, fourth, and fifth surfaces 103, 104, and 105. As an example, the above-described structure of the opening "O" and the surface insulating layer 600 may be formed, and the first and second connection portions 411 and 511 of the external electrodes 400 and 500 may then be formed by a plating process to fill the opening "O." Due the above-described structure of the opening "O" and the surface insulating layer 600, plating layer, respectively constituting the first and second connection portions 411 and 511 of the external electrodes 400 and 500, may be prevented from extending from each of the first and second surfaces 101 and 102 of the body 100 to the corner portion or the edge between each of the first and second surfaces 101 and 102 of the body and each of the third, fourth, and fifth surface 103, 104, and 105 of the body 100, respectively. That is, due to the above-described structure of the opening "O" and the surface insulating layer 600, the plating layer constituting the first and second connection portions 411 and 511 may be prevented from being formed to extend to each of the third, fourth, and fifth surfaces 103, 104, and 105 of the body 100, respectively. In other words, plating bleeding of the plating layers may be prevented.

The surface insulating layer 600 may be further disposed on the sixth surface 106 of the body 100. In this case, the opening "O," formed in the surface insulating layer 600 disposed on each of the first and second surfaces 101 and 102 of the body 100, may extend to the sixth surface 106 of the body 100. An internal wall of the opening "O," formed in the surface insulating layer 600 disposed on the sixth surface 106 of the body 100, may be formed to have a form which does not extend to a corner portion or an edge between the sixth surface 106 and the third surface 103 of the body 100 and a corner portion or an edge between the sixth surface 106 and the fourth surface 104 of the body 100. That is, the surface insulating layer 600, disposed on the sixth surface 106 of the body 100 may have a form covering the corner portion or the edge between the sixth surface 106 and the third surface 103 of the body 100 and the corner portion or the edge between the sixth surface 106 and the fourth surface 104 of the body 100, and may have a form exposing at least a portion of the corner portion or the edge between the sixth surface 106 and the first surface 101 of the body 100 and at least a portion of the corner portion or the edge between the sixth surface 106 and the second surface 102 of the body 100. A first pad portion 412 and a second pad portion 512 of the external electrodes 400 and 500 to be described later may be disposed in the opening "O" exposing the sixth surface 106 of the body 100. Due the above-described structure of the opening "O" and the surface insulating layer 600, the first and second pad portions 412 and 512 may be prevented from extending each of the third and fourth surfaces 103 and 104 of the body 100. As an example, the above-described structure of the opening "O" and the surface insulating layer 600 may be formed, and the first and second pad portions 412 and 512 of the externa electrodes 400 and 500 may then be formed by a plating process to fill the opening "O." Due to the above-describes structure of the opening "O" and the surface insulating layer 600, plating layers, respectively constituting the first and second pad portions 412 and 512 of the external electrodes 400 and 500, may each be prevented from extending from the sixth surface 106 of the body 100 to a corner portion or an edge between the sixth surface 106 of the body 100 and each of the third and fourth surfaces 103 and 104 of the body 100. That is, due to the above-described structure of the opening "O" and the surface insulating layer 600, the plating layers, respectively constituting the first and second pad portions 412 and 512, may each be prevented from extending to the third and fourth surfaces 103 and 104 of the body 100, respectively. In other words, plating bleeding of the plating layers may be prevented.

In the present embodiment, surface insulating layers 600 may be formed on the first to sixth surfaces 101, 102, 103, 104, 105, and 106 of the body 100 to respectively cover the entirety of the first to sixth surfaces 101, 102, 103, 104, 105, and 106 of the body 100, and an opening "o" may be formed in a surface insulating layer 600, disposed on each of the first, second, and sixth surfaces 101, 102, and 106 of the body 100, to expose a portion of each of the first, second, and sixth surfaces 101, 102, and 106 of the body and each of the first and second lead-out patterns 331 and 332. The surface insulating layers 600, respectively disposed on the first to sixth surfaces 101, 102, 103, 104, 105, and 106 of the body 100, may be formed together in the same process to be integrated with each other, such that a boundary may not be formed therebetween. As an example, the surface insulating layer 600 may be formed by spray-coating a liquid insulating material on the surface of the body 100. The opening "O" may be formed by irradiating a laser to the surface insulating layer 600, but an example of forming the opening "O" is not limited thereto. When the opening "O" is formed by irradiating a laser, a dicing burr may be removed together in a process of removing a portion of the surface insulating layer 600.

In the case of a typical thin film coil component, a coil bar including a plurality of coils connected to each other is manufactured, and is then diced to be individualized into a plurality of bodies of an individual component. An insulating layer is formed inside the coil bar to surround the plurality of coils, and end portions of the coils adjacent to each other in a length direction L are connected to each other. In the dicing process, a dicing saw cuts a boundary (a dicing line) between end portions of the coils, connected to each other in the length direction, to separate the end portions from other. After such a dicing process is completed, a dicing burr, formed by stretching and pushing the end portion of the coil and the insulating layer, by the dicing saw, may remain on a cut surface of the body of the individual component due to a pressure of the dicing saw and a ductility of a material forming the coil and the insulating layer. Since the above-described dicing burr formed on the cut surface of the body of the individual component causes defects to occur in a component, a grinding process for removing the above-described dicing burr is generally performed after the dicing process. In the present embodiment, the opening "O" may be formed by irradiating a laser. In such a laser irradiation process, the above-described dicing burr may be removed together using thermal energy of the laser. As a result, in the present embodiment, the total number of processes and process lead time may be reduced by omitting the grinding process generally required after the dicing process.

A width of the opening "O" exposing a portion of the first surface 101 of the body 100 (referring to a dimension in a width direction W of the opening "O," exposing the first surface 101 of the body 100, based on the direction of FIG. 8) may be the same as a width of the opening "O" exposing a portion of the sixth surface 106 of the body 100 (referring to a dimension in a width direction of the right opening "O," exposing the sixth surface 106 of the body 100, based on the direction of FIG. 8). A width of the opening "O" exposing a portion of the second surface 102 of the body 100 (referring to a dimension in a width direction of the opening "O," exposing the second surface 102 of the body 100, based on the direction of FIG. 8) may the same as a width of the opening "O" exposing a portion of the sixth surface 106 of the body 100 (referring to a dimension in a width direction W of the left opening "O," exposing the sixth surface 106 of the body 100, based on the direction of FIG. 8). In this case, since the connection portions 411 and 511 and the pad portions 412 and 512 of the external electrodes 400 and 500 to be described later may be formed to have the same width, exterior defects may be reduced.

The opening "O," exposing a portion of the first, second and sixth surfaces 101, 102, 106 of the body 100, may have a form in which a portion of the first, second, and sixth surfaces 101, 102, and 106 of the body 100 exposed to the opening "O" and a portion of the insulating film IF exposed to the opening "O" are removed. That is, the opening "O" may have a form extending inwardly of the first, second and sixth surfaces 101, 102, 106 of the exposed body 100 such that grooves "R" are respectively formed in the first, second, and sixth surfaces 101, 102, and 106 of the exposed body 100. Since the groove "R" communicates with the opening "O," they may have substantially the same configuration. As an example, the groove "R" may be formed by removing a portion of the first, second, and sixth surfaces 101, 102, and 106 of the body 100 using thermal energy of a laser and a portion of the exposed insulating film IF, but exemplary embodiments are not limited thereto. Because the other portion of the body 100 may not be irradiated by the laser, a surface of the groove "R" may have a surface roughness different from that of the other portion of the body which is not irradiated by the laser. As described above, since the connection portions 411 and 511 are disposed in the opening "O," a contact area between the connection portions 411 and 511 and the lead-out patterns 331 and 332 may be increased due to the groove "R." As a result, reliability of connection between the coil portion 300 and the external electrodes 400 and 500 may be improved.

A region, disposed in the groove "R," of the connection portions 411 and 511 may have a greater thickness (a length of the connection portions 411 and 511 in the length direction L of FIG. 7) than the other regions. That is, an interface between the connection portions 411 and 511 and a lower surface of the groove "R" may be disposed on a relatively lower level than an interface between the surface insulating layer 600 and the first and second surfaces 101 and 102 of the body 100. In addition, an interface between the connection portions 411 and 511 and the insulating film IF exposed to a lower surface of the groove "R" may be disposed on a relatively lower level than an interface between the surface insulating layer 600 and the first and second surfaces 101 and 102 of the body 100, based on a direction of FIG. 10. That is, an interface between the second connection portion 511 and the lower surface of the groove "R" and an interface between the second connection portion 511 and the insulating film IF exposed to the lower surface of the groove "R" may each be disposed to be closer to an inside of the body 100 than an interface between the surface insulating layer 600 and the second surface 102 of the body 100, based on the direction of FIG. 10. As a result, the region, disposed in the groove "R," of the connection portions 411 and 511 may be resistant to external stress applied in the thickness direction T and/or the width direction W (an anchoring effect), and the reliability of connection between the coil portion 300 and the external electrodes 400 and 500 may be further improved.

The surface insulating layer 600 may function as a plating resist when the first layers 410 and 510 of the external electrodes 400 and 500 to be described later are formed by a plating process, but exemplary embodiments are not limited thereto.

The surface insulating layer 600 may include a thermoplastic resin such as polystyrene resin, vinyl acetate resin, polyester resin, polyethylene resin, polypropylene resin, polyamide resin, rubber resin, acrylic resin, or the like, a thermosetting resin such as phenol resin, epoxy resin, urethane resin, melamine resin, alkyd resin, or the like, photosensitive resin, parylene, $SiO_x$, or $SiN_x$.

The surface insulating layer 600 may have an adhesive function. As an example, when an insulating film is laminated on the body 100 to form the surface insulating layer 600, the insulating film including an adhesive element may adhere to the surface of the body 100. In this case, an adhesive layer may be additionally formed on one surface of the second insulating layer 620. However, an additional adhesive layer may not be formed on one surface of the second insulating layer 620 in the case in which the surface insulating layer 600 is formed using a semi-cured (B-stage) insulating film, or the like.

The surface insulating layer 600 may be formed by applying a liquid insulating resin to a surface of the body 100, laminating an insulating film on a surface of the body 100, or forming an insulating resin on a surface of the body using vapor deposition. The insulating film may be a dry film (DF) which includes a photosensitive insulating resin, an Ajinomoto Build-up Film (ABF) which does not include a photosensitive insulating resin, a polyimide film, or the like.

The surface insulating layer 600 may be formed to have a thickness range of 10 nm to 100 μm. When the surface insulating layer 600 has a thickness less than 10 nm, characteristics of the coil components, such as a Q factor, a breakdown voltage, a self-resonant frequency (SRF), and the like, may be reduced. When the surface insulating layer 600 has a thickness greater than 100 μm, overall length, width, and thickness of the coil component may be increased to be disadvantageous for thinning of the coil component.

The external electrodes 400 and 500 may be disposed on the first and second surfaces 101 and 102 of the body 100 to be connected to the coil portion 300, and may be disposed to be spaced apart from each other on the sixth surface 106 of the body 100. The external electrodes 400 and 500 may include connection portions 411 and 511, disposed in the openings "O" formed in the surface insulating layer 600 disposed on the first and second surfaces 101 and 102 of the body 100 to be in contact with the lead-out patterns 331 and 332, and pad portions 412 and 512 extending from the connection portions 411 and 511 to the sixth surface 106 of the body 100.

The external electrodes 400 and 500 may include a first external electrode 400, which is in contact with and connected to the first lead-out pattern 331, and a second external electrode 500 which is in contact with and connected to the second lead-out pattern 332. In the present embodiment, the first and second external electrodes 400 and 500 may include first layers 410 and 510 and second layers 420 and 520 disposed on the first layers 410 and 510. Specifically, the first external electrode 400 may include a first connection portion 411, disposed on the first surface 101 of the body 100 to be in contact with and connected to the first lead-out pattern 331, a first layer 410 including a first pad portion 412 extending from the first connection portion 411 to the sixth surface of the body 100, and a second layer 420 disposed on the first pad portion 412 of the first layer 410. The second external electrode 500 may include a second connection portion 511 disposed on the second surface 102 of the body 100 to be in contact with and connected to the second lead-out pattern 332, a first layer 510 including a second pad portion 512 extending from the second connection portion 511 to the sixth surface 106 of the body 100, and a second layer 520 disposed on the second pad portion 512 of the first layer 510. The connection portions 411 and 511 of the first layers 410 and 510 may fill the openings "O" formed in the surface insulating layers 600 disposed on the first and second surfaces 101 and 102, respectively. The pad portions 412 and 512 of the first layers 410 and 510 may fill the openings "O" formed in the surface insulating layer 600 disposed on the sixth surface 106 of the body 100, respectively. The pad portions 412 and 512 may be disposed on the sixth surface 106 of the body 100 to be spaced apart from each other.

The first layers 410 and 510 of the external electrodes 400 and 500 may be formed on the surface of the body 100 to fill the opening "O" of the surface insulating layer 600 by performing an electrolytic plating process using the surface insulating layer 600, formed on the surface of the body 100, as a plating resist. When the body 100 includes metal magnetic powder particles, the metal magnetic powder particles may be exposed to the surface of the body 100. Due to the metal magnetic powder particles exposed on the surface of the body 100, conductivity may be provided to the surface of the body 100 during electroplating, and the first layers 410 and 510 of the external electrodes 400 and 500 may be formed on the surface of the body 100 by electroplating.

The connection portions 411 and 511 and the pad portions 412 and 512 of the external electrodes 400 and 500 may be formed by the same plating process, such that a boundary may not be formed therebetween. That is, the first connection portion 411 and the first pad portion 412 may be formed to be integrated with each other, and the second connection portion 511 and the second pad portion 512 may be formed to be integrated with each other. In addition, the connection portions 411 and 511 and the pad portions 412 and 512 may be formed of the same metal. However, such a description does not exclude the case, in which the connection portions 411 and 511 and the pad portions 412 and 512 are formed by different plating processes to form a boundary therebetween, from the scope of the present disclosure.

Each of the second layers 420 and 520 may include a plating layer. Specifically, the second layer 420 of the first external electrode 400 may include a nickel (Ni) plating layer, disposed in the first pad portion 412 and including nickel (Ni), and a tin (Sn) plating layer disposed on the nickel (Ni) plating layer and including tin (Sn). The second layer 520 of the second external electrode 500 may include a nickel (Ni) plating layer, disposed in the second pad portion 512 and including nickel (Ni), and a tin (Sn) plating layer disposed on the nickel (Ni) plating layer and including tin (Sn).

The external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but an example of the conductive material is not limited thereto.

Each of the external electrodes 400 and 500 may be formed to have a thickness ranging from 0.5 μm to 100 μm. When the thickness of each of the external electrodes 400 and 500 is less than 0.5 μm, a board may be detached and peeled off during mounting the coil component 1000 on the board. When each of the external electrodes 400 and 500 has a thickness greater than 100 μm, it may be disadvantageous for thinning of coil components.

The cover insulating layer 700 may be disposed on each of the first and second surfaces 101 and 102 of the body 100 to cover the surface insulating layer 600, disposed on the first and second surfaces 101 and 102, and the connection portions 411 and 511 of the first and second external electrodes 400 and 500. The cover insulating layer 700 may cover the connection portions 411 and 511 of the first and second external electrodes 400 and 500 to prevent the coil component 1000 from being short-circuited with another electronic component, adjacent and mounted, when the coil component 1000 is mounted on a mounting board such as a printed circuit board (PCB), or the like.

The cover insulating layer 700 may include a thermoplastic resin such as a polystyrene-based resin, a vinyl acetate-based resin, a polyester-based resin, a polyethylene-based resin, a polypropylene-based resin, a polyamide-based resin, a rubber-based resin, an acrylic-based resin, a thermosetting resin such as a phenol-based resin, an epoxy-based resin, a urethane-based resin, a melamine-based resin, and an alkyd-based resin, a photosensitive resin, parylene, $SiO_x$, or $SiN_x$.

The cover insulating layer 700 may have an adhesive function. As an example, when an insulating film is laminated on the body 100 to form the cover insulating layer 700, the insulating film may include an adhesive element. In this case, an adhesive layer may be additionally formed on one surface of the cover insulating layer 700. However, an additional adhesive layer may not be formed on one surface of the cover insulating layer 700 in the case, in which the cover insulating layer 700 is formed using a semi-cured (B-stage) insulating film, or the like.

The cover insulating layer 700 may be formed by applying a liquid insulating resin to a surface of the body 100, laminating an insulating film on a surface of the body 100, or forming an insulating resin on a surface of the body using vapor deposition. The insulating film may be a dry film (DF) including a photosensitive insulating resin, an Ajinomoto Build-up Film (ABF), a polyimide film, or the like.

The cover insulating layer 700 may be formed to have a thickness ranging from 10 nm to 100 μm. When the cover insulating layer 700 has a thickness less than 10 nm, characteristics of the coil components, such as a Q factor, a breakdown voltage, a self-resonant frequency (SRF), and the like, may be reduced. When the cover insulating layer 700 has a thickness greater than 100 μm, an overall length of the coil component may be increased to be disadvantageous for thinning of the coil component.

Therefore, in the coil component 1000 according to the present embodiment, the first layers 410 and 510 may be prevented from extending to each of the first, fourth, and fifth surfaces 103, 104, and 105 of the body 100 when the first layers 410 and 510 of the external electrodes 400 and 500 are formed by a plating process. A plating layer may be prevented from bleeding to each of the third, fourth, and fifth surfaces 103, 104, and 105 of the body 100 when the first layers 410 and 510 are formed by a plating process. In addition, in the coil component 1000 according to the present embodiment, a groove "R" may be formed on the surface of the body 100, exposed to the opening "O," to improve bonding force between the external electrodes 400 and 500, filling the opening "O," and the coil portion 300. Moreover, in the coil component 1000 according to the present disclosure, a grinding process of removing a dicing burr may be omitted when an opening "O" is formed by irradiating a laser, so that the total number of processes may be decreased to reduce a process lead time.

Figure 11:
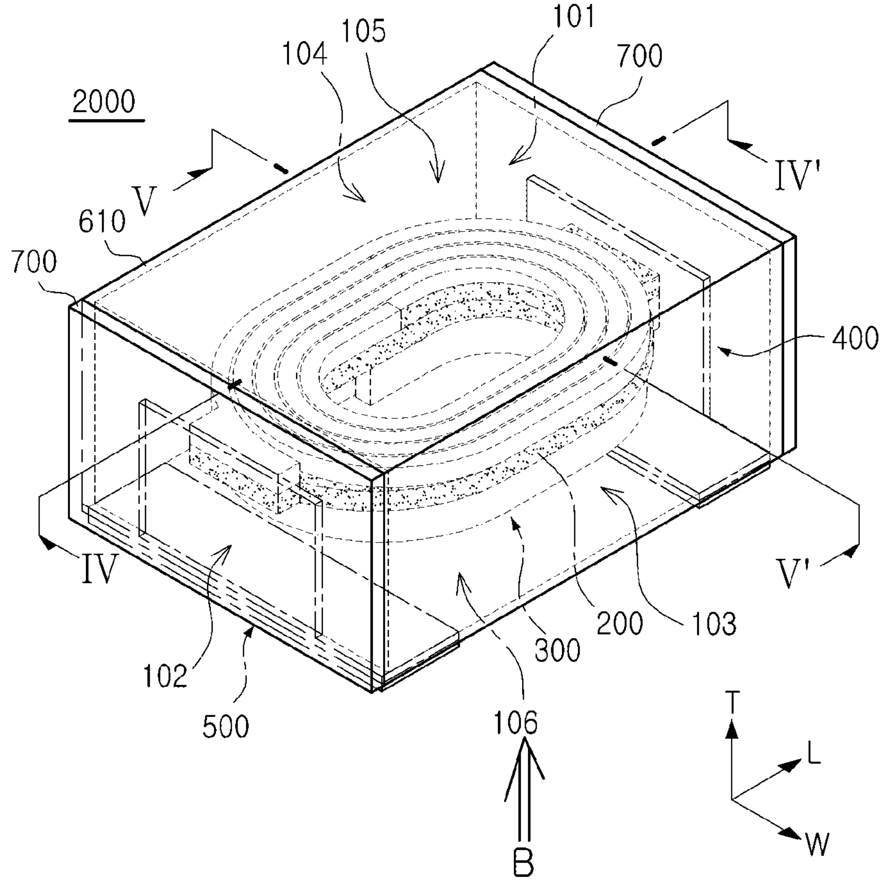
FIG. 11 is a schematic perspective view of a coil component according to another exemplary embodiment of the present disclosure.
Figure 12:
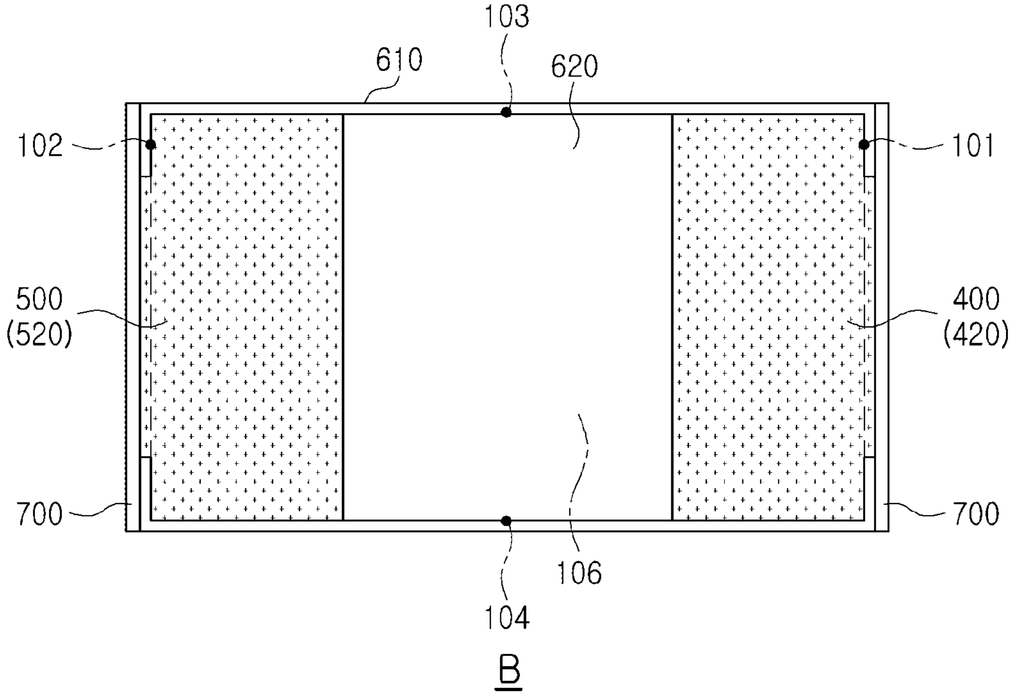
FIG. 12 is a schematic view taken in direction “B” of FIG. 11.
Figure 13:
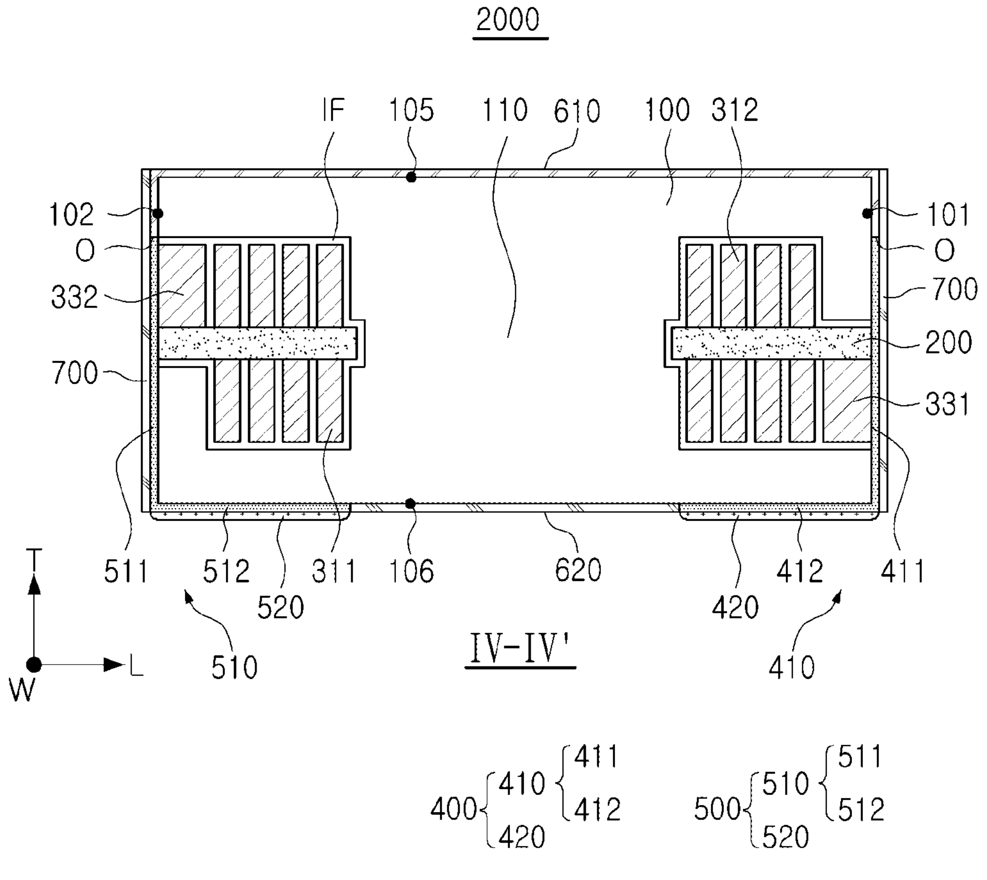
FIG. 13 is a cross-sectional view taken along line IV-IV' of FIG. 11.
Figure 14:
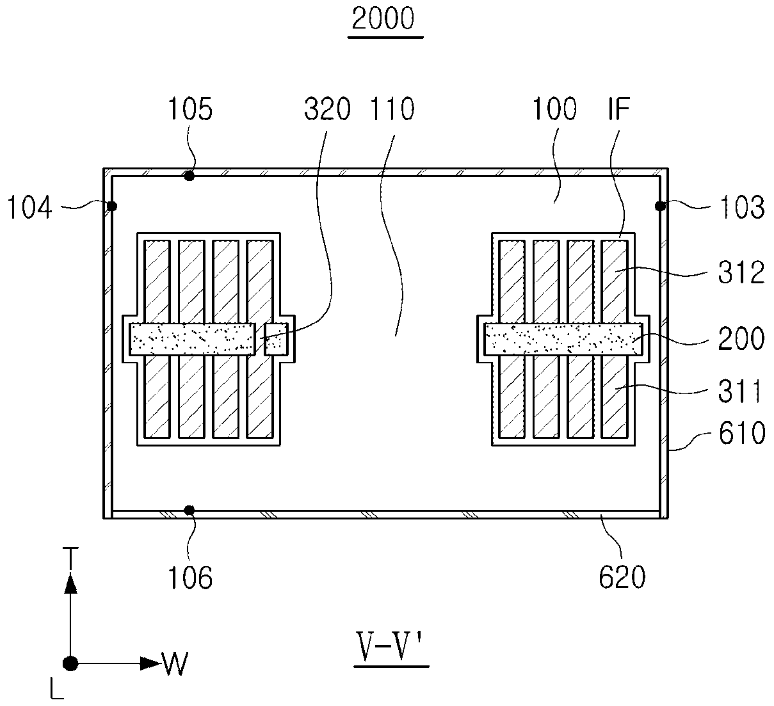
FIG. 14 is a cross-sectional view taken along line V-V' of FIG. 11.
Figure 15:
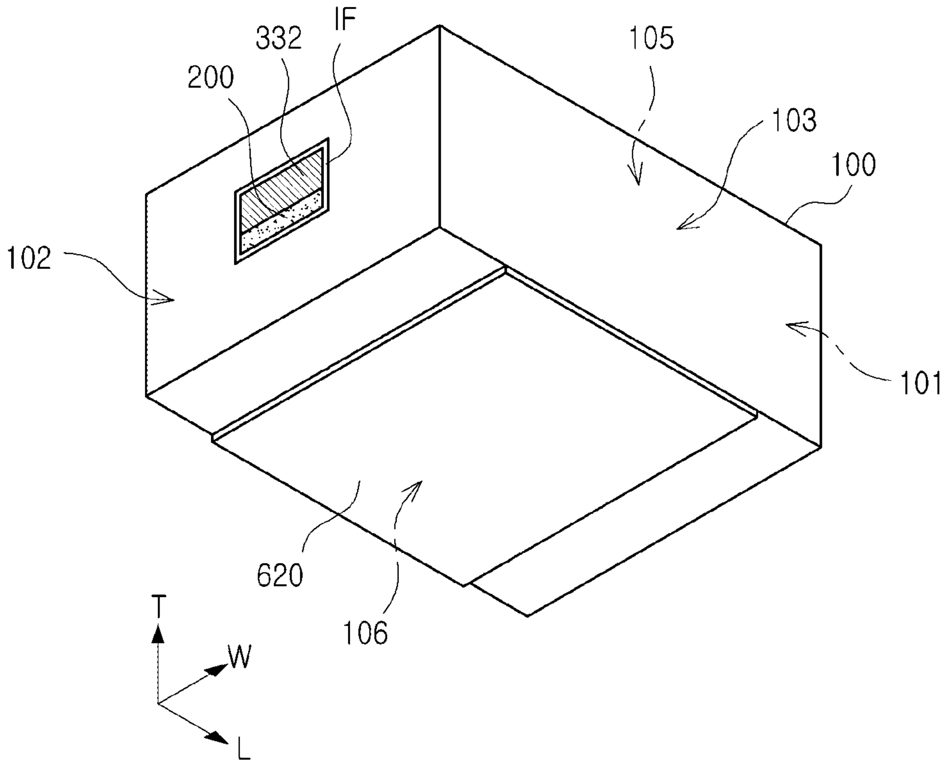
FIG. 15 is a schematic perspective view of a coil component according to another exemplary embodiment of the present disclosure, excluding some elements, when viewed from below.
Figure 16:
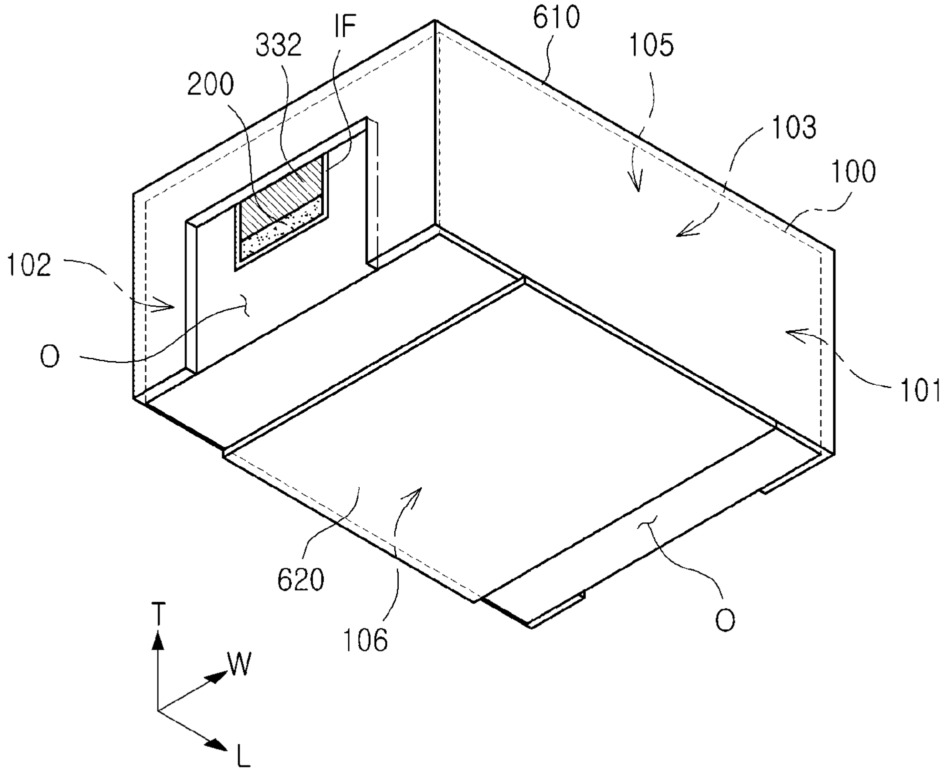
FIG. 16 is a schematic perspective view in which a second insulating layer is added to FIG. 15.

FIG. 11 is a schematic perspective view of a coil component according to another exemplary embodiment. FIG. 12 is a schematic view taken in direction "B" of FIG. 11. FIG. 13 is a cross-sectional view taken along line IV-IV' of FIG. 11. FIG. 14 is a cross-sectional view taken along line V-V' of FIG. 11. FIG. 15 is a schematic perspective view of a coil component according to another exemplary embodiment of the present disclosure, excluding some elements, when viewed from below. FIG. 16 is a schematic perspective view in which a second insulating layer is added to FIG. 15.

When comparing FIGS. 1 to 10 with FIGS. 11 to 15, a difference between a coil component 2000 according to another exemplary embodiment is different in external electrodes 400 and 500 and surface insulating layers 610 and 620 from the coil component 1000 according to an exemplary embodiment. Therefore, only the external electrodes 400 and 500 and the surface insulating layer 610 and 620 of the coil component 2000 will be described.

Referring to FIGS. 11 to 15, in the present embodiment, the surface insulating layers 610 and 620 may include a first insulating layer 610, disposed on first to fifth surfaces 101, 102, 103, 104, and 105 of a body 100, and a second insulating layer 620 disposed on a sixth surface 106 of the body 100.

Since the first insulating layer 610 is the same as the above-described surface insulating layer 600 except that the first insulating layer 610 is not disposed on the sixth surface 106 of the body 100, the description of the first insulating layer 610 will be omitted.

The second insulating layer 620 may be formed on the sixth surface 106 of the body 100. The second insulating layer 620 may be disposed in a central portion of the sixth surface 106 of the body 100 in a length direction L to extend in a width direction W. The second insulating layer 620 may extend to a corner portion or an edge between the sixth surface 106 of the body 100 and each of the third and fourth surfaces 103 and 104 of the body 100. Thus, in the present embodiment, an opening "O" exposing a portion of the sixth surface 106 of the body 100 may be formed to expose the entire sixth surface 106 of the body 100 in the width direction W, unlike the above-described embodiment. As a result, pad portions 412 and 512 of the present embodiment may be formed on the entire sixth surface 106 of the body 100 in the width direction W. That is, based on a direction of FIG. 12, a first pad portion 412 may cover an entire left region of the first insulating layer, disposed on the sixth surface 106 of the body 100, in the width direction W, and a second pad portion 512 may cover an entire right region of the first insulating layer 610, disposed on the sixth surface 106 of the body 100, in the width direction W. In the present embodiment, since each of the pad portions 412 and 512 is formed on the entire sixth surface 106 of the body 100 in the width direction W, a contact area between a coupling member such as a solder, used to mount the coil component 2000 according to the present disclosure on a mounting board, or the like, and the external electrodes 400 and 500 may be increased.

The second insulating layer 620 may be formed, in a batch, in regions corresponding to a plurality of individual components in a coil bar state. The first insulating layer 610 may be formed on the plurality of individualized bodies 100 after a dicing process. Specifically, the first insulating layer 610 may be formed to surround the first to fourth surfaces 101, 102, 103 and 104, dicing surfaces of the body 100, and to additionally cover the fifth surface 105 of the body 100. As a result, a boundary may be formed between the first and second insulating layers 610 and 620.

The second insulating layer 620 may include a thermoplastic resin such as polystyrene resin, vinyl acetate resin, polyester resin, polyethylene resin, polypropylene resin, polyamide resin, rubber resin, acrylic resin, or the like, a thermosetting resin such as phenol resin, epoxy resin, urethane resin, melamine resin, alkyd resin, or the like, photosensitive resin, parylene, $SiO_x$, or $SiN_x$.

The second insulating layer 620 may have an adhesive function. As an example, when an insulating film is laminated on the body 100 to form the second insulating layer 620, the insulating film including an adhesive element may adhere to the surface of the body 100. In this case, an adhesive layer may be additionally formed on one surface of the second insulating layer 620. However, an additional adhesive layer may not be formed on one surface of the second insulating layer 620 in the case in which the second insulating layer 620 is formed using a semi-cured (B-stage) insulating film, or the like.

The second insulating layer 620 may be formed to have a thickness range of 10 nm to 100 μm. When the second insulating layer 620 has a thickness less than 10 nm, characteristics of the coil components, such as a Q factor, a breakdown voltage, a self-resonant frequency (SRF), and the like, may be reduced. When the second insulating layer 620 has a thickness greater than 100 μm, overall length, width, and thickness of the coil component may be increased to be disadvantageous for thinning of the coil component.

As described above, according to the present disclosure, plating bleeding of an external electrode may be prevented while maintaining connectivity between a coil portion and the external electrode.

In addition, according to the present disclosure, a process lead time may be reduced by omitting a process of removing burring after a dicing process.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a support substrate disposed in the body;

a coil portion disposed on the support substrate and including a first lead-out pattern extending from one end surface of the body;

a first insulating layer disposed on the one end surface of the body, and having an opening disposed on a surface of the first lead-out pattern extending from the one end surface of the body and on at least a portion of the one end surface of the body;

a first external electrode including a first connection portion, disposed to be in contact with the first lead-out pattern, and a first pad portion extending from the first connection portion to one surface of the body connected to the one end surface of the body; and a cover insulating layer disposed on the one end surface of the body to cover the first connection portion, wherein the first connection portion is spaced apart from all corner portions of the one end surface of the body, except for a corner portion between the one end surface of the body and the one surface of the body, on the one end surface of the body, the body has one side surface and another side surface, each connected to the one surface and the one end surface of the body, and opposing each other, the first pad portion covers a corner portion where the one surface, the one side surface, and the one end surface of the body meet and a corner portion where the one surface, the another side surface, and the one end surface of the body meet, on the one surface of the body, the first external electrode further includes a plating layer disposed on the first pad portion to cover the corner portion where the one surface, the one side surface, and the one end surface of the body meet and the corner portion where the one surface, the another side surface, and the one end surface of the body meet, on the one surface of the body, and the cover insulating layer is spaced apart from a side surface of the plating layer.

2. The coil component of claim 1, further comprising:

a second insulating layer disposed on the one surface of the body and exposing at least a portion of the one surface of the body and also on the one side surface and the another side surface of the body, wherein the first pad portion is disposed on the one surface of the body exposed to the second insulating layer.

3. The coil component of claim 2, wherein the first and second insulating layers are integrated with each other.

4. The coil component of claim 1, wherein the first and second insulating layers have an interface therebetween.

5. The coil component of claim 1, wherein the one end surface of the body is provided with a groove recessed from an interface between the one end surface of the body and the first insulating layer.

6. The coil component of claim 5, wherein the first connection portion is in contact with a lower surface of the groove, and an interface between the first connection portion and the lower surface of the groove and the interface between the first insulating layer and the one end surface of the body are disposed on different levels.

7. The coil component of claim 5, further comprising:

an insulating layer covering the coil portion and extending to the one end surface of the body, wherein the first connection portion is in contact with the insulating layer extending to the one end surface of the body, and an interface between the first connection portion and the insulating layer extending from the lower surface of the groove and an interface between the first insulating layer and the one end surface of the body are disposed on different levels.

8. The coil component of claim 1, wherein the first connection portion and the first pad portion are integrated with each other.

9. The coil component of claim 1, wherein the body further has another end surface connected to the one surface of the body and opposing the one end surface of the body, the coil portion further includes a second lead-out pattern extending from the another end surface of the body, and the first insulating layer is also disposed on the another end surface of the body, and has another opening disposed on the second lead-out pattern extending from the another end surface of the body and on at least a portion of the another end surface of the body.

10. A coil component comprising:

a body;

a support substrate disposed in the body;

a coil portion disposed on the support substrate and including a lead-out pattern extending from one end surface of the body;

a first insulating layer disposed on the one end surface of the body, and having an opening disposed on the lead-out pattern;

an external electrode including a connection portion, disposed in the opening of the first insulating layer to be in contact with the lead-out pattern, and a pad portion extending from the connection portion to one surface of the body connected to the one end surface of the body; and a cover insulating layer disposed on the one end surface of the body to cover the connection portion, wherein the connection portion is spaced apart from edges of the one end surface of the body, except for an edge between the one end surface of the body and the one surface of the body, the body has one side surface and the another side surface, each connected to the one surface and the one end surface of the body, and opposing each other, the pad portion covers a corner portion where the one surface, the one side surface, and the one end surface of the body meet and a corner portion where the one surface, the another side surface, and the one end surface of the body meet, on the one surface of the body, the external electrode further includes a plating layer disposed on the pad portion to cover the corner portion where the one surface, the one side surface, and the one end surface of the body meet and the corner portion where the one surface, the another side surface, and the one end surface of the body meet, on the one surface of the body, and among the one end surface of the body and the one surface of the body, the cover insulating layer is disposed only on the one end surface of the body.

11. The coil component of claim 10, further comprising:

a second insulating layer disposed on the one surface of the body and exposing at least a portion of the one surface of the body, wherein the pad portion is disposed on the one surface of the body exposed to the second insulating layer.

12. The coil component of claim 10, wherein the one end surface of the body is provided with a groove recessed from an interface between the one end surface of the body and the first insulating layer.

13. The coil component of claim 12, wherein the connection portion is disposed in the groove.

14. The coil component of claim 12, wherein a surface of the groove has a roughness different from that of the one end surface of the body.

* * * * *